United States Patent
Kang et al.

(10) Patent No.: US 11,775,101 B2
(45) Date of Patent: Oct. 3, 2023

(54) ELECTRONIC DEVICE FOR RECOGNIZING STYLUS PEN AND METHOD FOR OPERATING THEREOF

(71) Applicant: Samsung Electronics Co., Ltd., Gyeonggi-do (KR)

(72) Inventors: Byunghoon Kang, Gyeonggi-do (KR); Myeongsil Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/751,957

(22) Filed: May 24, 2022

(65) Prior Publication Data

US 2022/0382431 A1 Dec. 1, 2022

(30) Foreign Application Priority Data

May 25, 2021 (KR) .......................... 10-2021-0066687

(51) Int. Cl.
*G06F 3/041* (2006.01)
*G06F 3/044* (2006.01)
*G06F 1/16* (2006.01)
*G06F 3/0354* (2013.01)

(52) U.S. Cl.
CPC ........ *G06F 3/04162* (2019.05); *G06F 1/1652* (2013.01); *G06F 1/1681* (2013.01); *G06F 3/03545* (2013.01); *G06F 3/0441* (2019.05); *G06F 3/0442* (2019.05)

(58) Field of Classification Search
CPC .. G06F 3/04162; G06F 3/0441; G06F 3/0442; G06F 3/03543; G06F 1/1652; G06F 1/1681
See application file for complete search history.

(56) References Cited

U.S. PATENT DOCUMENTS

| | | | |
|---|---|---|---|
| 10,592,051 B1* | 3/2020 | Yildiz | G06F 1/1694 |
| 2020/0033961 A1* | 1/2020 | Shin | G06F 3/03545 |
| 2020/0050350 A1 | 2/2020 | Lee et al. | |
| 2020/0333836 A1* | 10/2020 | Kim | G06F 1/1683 |

* cited by examiner

*Primary Examiner* — Lisa S Landis
(74) *Attorney, Agent, or Firm* — Cha & Reiter, LLC

(57) ABSTRACT

According to certain embodiments, a foldable electronic device comprises: a flexible display; a first housing in which a first region of the flexible display is positioned; a second housing in which a second region of the flexible display is positioned; a hinge structure interposed between the first housing and the second housing and forming a folding axis; a sensor panel interposed between the flexible display and each of the first housing and the second housing, the sensor panel configured to identify input information of a stylus pen, and including a plurality of first vertical channels interposed the first housing and the first region of the flexible display and a plurality of second vertical channels disposed between the second housing and the second region of the flexible display; and a processor configured to control the sensor panel, wherein the processor is configured to: detect whether the foldable electronic device is folded; when the foldable electronic device is folded, transmit a deviation detection signal to at least one of the plurality of first vertical channels and receive the deviation detection signal through at least one of the plurality of second vertical channels; and correct the input information of the stylus pen using a compensation value corresponding to the received deviation detection signal.

17 Claims, 11 Drawing Sheets

ELECTRONIC DEVICE FOR RECOGNIZING STYLUS PEN AND METHOD FOR OPERATING THEREOF

CROSS-REFERENCE TO RELATED APPLICATION(S)

This application claims the benefit under 35 U.S.C. § 119(a) of a Korean patent application filed on May 25, 2021 in the Korean Intellectual Property Office and assigned Serial number 10-2021-0066687, the entire disclosure of which is hereby incorporated by reference.

TECHNICAL FIELD

Embodiments disclosed in this specification relate to a foldable electronic device for recognizing a stylus pen and an operating method thereof.

BACKGROUND

An electronic device can receive various inputs from a user. The inputs can be received from a specified input device (e.g., a stylus pen) through wireless communication. The electronic device may identify an input location of a stylus pen on the electronic device, and may perform a function corresponding thereto.

The electronic device may detect a magnetic field generated from a stylus pen by using electro magnetic resonance (hereinafter referred to as "EMR"). The electronic device may identify a location of the stylus pen based on the induced electromotive force generated by the magnetic field for each channel. Electronic device measurements, and specifications may deviate from product to product. The foregoing may be caused by differences for each internal component. Differences in the thickness and/or gap tolerance for each component, the differences in sensitivity of sensor panels, and magnetic interference elements (e.g., a magnetic substance) can be different electronic devices, even of the same model. For example, because the inductance in the stylus pen is varies by the magnetic substance included in the electronic device, the resonance frequency with the stylus pen may be shifted. As a result, the resonance frequency may also have deviations.

SUMMARY

According to certain embodiments, a foldable electronic device comprises: a flexible display; a first housing in which a first region of the flexible display is positioned; a second housing in which a second region of the flexible display is positioned; a hinge structure interposed between the first housing and the second housing and forming a folding axis; a sensor panel interposed between the flexible display and each of the first housing and the second housing, the sensor panel configured to identify input information of a stylus pen, and including a plurality of first vertical channels interposed the first housing and the first region of the flexible display and a plurality of second vertical channels disposed between the second housing and the second region of the flexible display; and a processor configured to control the sensor panel, wherein the processor is configured to: detect whether the foldable electronic device is folded; when the foldable electronic device is folded, transmit a deviation detection signal to at least one of the plurality of first vertical channels and receive the deviation detection signal through at least one of the plurality of second vertical channels; and correct the input information of the stylus pen using a compensation value corresponding to the received deviation detection signal.

According to certain embodiments, an operating method of a foldable electronic device that recognizes a stylus pen, the method comprises: detecting whether the foldable electronic device is folded; when the foldable electronic device is folded, transmitting and receiving a deviation detection signal through a sensor panel; and correcting input information of the stylus pen using a compensation value corresponding to the received deviation detection signal, wherein the sensor panel includes a plurality of first vertical channels and a plurality of second vertical channels, which are separated with respect to a folding axis of the foldable electronic device, and wherein the transmitting and receiving of the deviation detection signal through the sensor panel includes: transmitting the deviation detection signal to at least one of the plurality of first vertical channels; and receiving the deviation detection signal through at least one of the plurality of second vertical channels.

According to certain embodiments, a foldable electronic device comprises: a flexible display; a sensor panel disposed under the flexible display configured to identify input information of a stylus pen, and including a plurality of first vertical channels and a plurality of second vertical channels; and a processor configured to control the sensor panel, wherein the processor is configured to: when the plurality of first vertical channels and the plurality of second vertical channels are arranged such that the plurality of first vertical channels respectively face the plurality of second vertical channels, transmit a deviation detection signal to at least one of the plurality of first vertical channels; receive the deviation detection signal through at least one of the plurality of second vertical channels; and correct the input information of the stylus pen by using a compensation value corresponding to the received deviation detection signal.

DETAILED DESCRIPTION

There is a need for a sufficient margin of error for determining whether the stylus pen is input, due to the fluctuation of the resonance frequency by variances in electronic devices. When an input margin of error of the stylus pen is small, it may be recognized that the stylus pen is input, even though the stylus pen is not touched. When the margin is great, high pen pressure may be detected, and thus the pen pressure may not be precisely detected.

Certain embodiments of this specification may provide a foldable electronic device capable of correcting a variation in a resonant frequency due to the deviation of electronic devices.

According to certain embodiments disclosed in this specification, a foldable electronic device may detect a deviation of the foldable electronic device by using a sensor panel.

According to certain embodiments disclosed in this specification, the foldable electronic device may correct input information of a stylus pen by using a compensation value corresponding to the detected deviation.

According to certain embodiments disclosed in this specification, the foldable electronic device may provide a user with the standardized usage feeling, thereby improving product satisfaction.

Besides, a variety of effects directly or indirectly understood through the specification may be provided.

Hereinafter, certain embodiments of the disclosure will be described with reference to accompanying drawings. However, those of ordinary skill in the art will recognize that modification, equivalent, and/or alternative on certain embodiments described herein may be variously made without departing from the scope and spirit of the disclosure.

Figure 1:
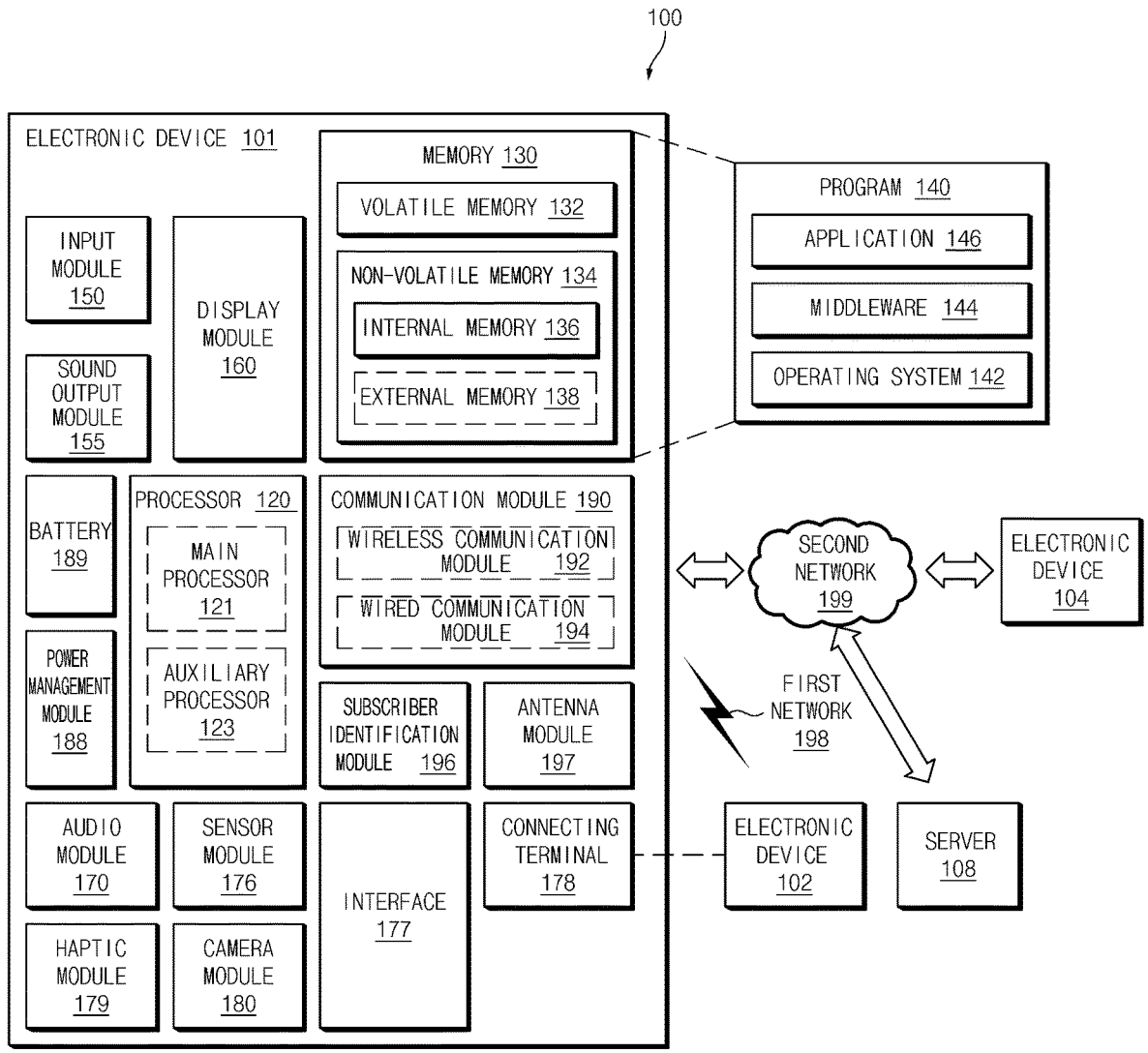
FIG. 1 is a block diagram illustrating an electronic device in a network environment according to certain embodiments.

FIG. 1 is a block diagram illustrating an electronic device 101 in a network environment 100 according to certain embodiments.
Electronic Device Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The term "processor" shall be understood to refer to both the singular and plural contexts.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The display module 160 can also receive input from a stylus pen. The display module 160 detects the stylus pen through EMR. However, differences in the properties of the electronic component can cause variances in the resonant frequency. Accordingly, there is a sufficient margin of error to allow for detection of the stylus pen.

Figures 2A, 2B:
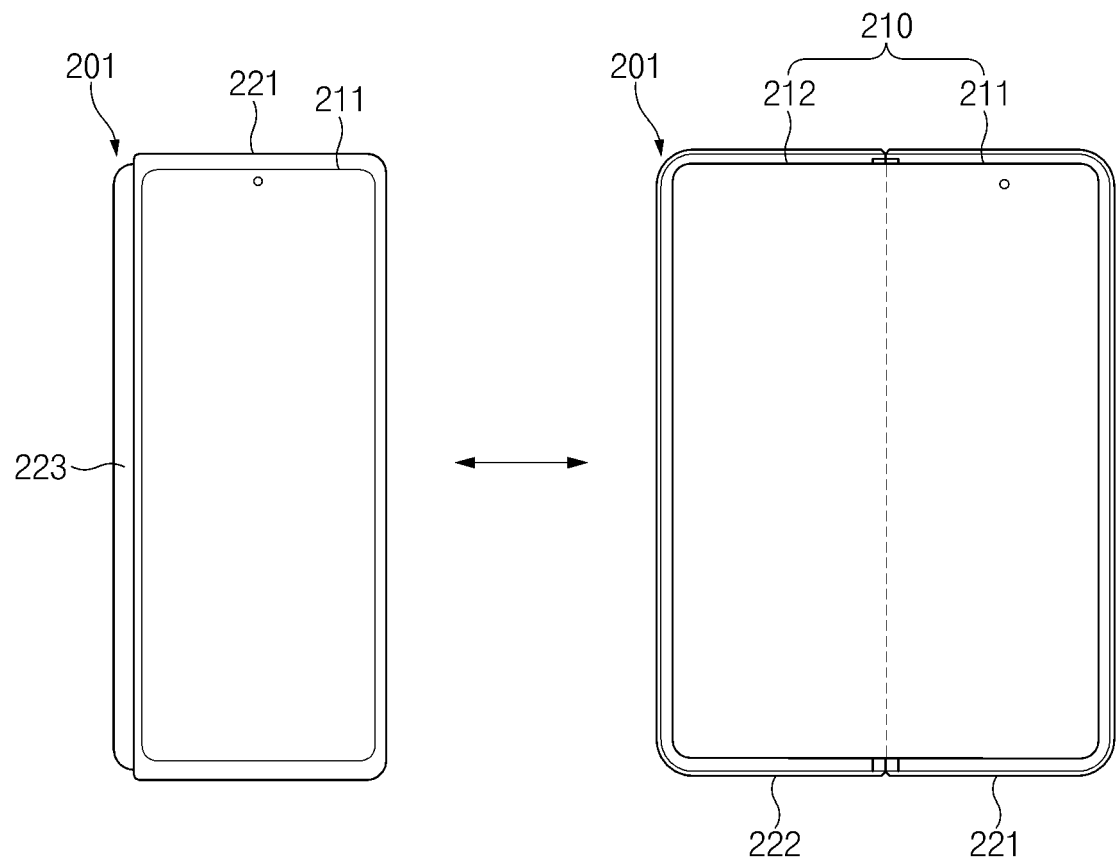
FIG. 2A is a view illustrating a fully-folded state of an electronic device, according to certain embodiments.
FIG. 2B is a view illustrating an unfolded state of an electronic device, according to certain embodiments.

Additionally, the electronic device 101 may have a foldable housing. The foldable housing allows for a larger display module size 160, while preserving the portability of the electronic device 101. FIGS. 2A and 2B shows the housing of the electronic device in both a folded state (FIG. 2A) and the unfolded state (FIG. 2B).

Foldable Housing

According to an embodiment, an electronic device may be a foldable electronic device including a foldable display. Hereinafter, a fully-folded state and a fully-unfolded state of the foldable electronic device will be described with reference to FIGS. 2A and 2B.

FIGS. 2A and 2B are views illustrating a fully-folded state and a fully-unfolded state of an electronic device, according to an embodiment.

Referring to FIGS. 2A and 2B, an electronic device 201 (e.g., the electronic device 101 of FIG. 1) may include foldable housing including first housing 221 and second housing 222, and a hinge structure 223. The first housing 221 and the second housing 222 may be connected by the hinge structure 223. The first housing 221 and the second housing 222 may be geometrically transformed by changing the arrangement between the first housing 221 and the second housing 222 with respect to the hinge structure 223, thereby forming a folding axis.

For example, the first housing 221 and the second housing 222 may be arranged at a specific angle of 0° or more and 180° or less with respect to the hinge structure 223. Hereinafter, an operation of the electronic device 201, in which a specific angle formed by the first housing 221 and the second housing 222 decreases, may be referred to as a folding operation. The operation of the electronic device 201 in which the specific angle increases may be referred to as an unfolding operation.

The electronic device 201 may include a display 210 including a first region 211 and a second region 212. According to an embodiment, the first region 211 of the display 210 may be positioned in the first housing 221, and the second region 212 of the display 210 may be positioned in the second housing 222. The first region 211 of the display 210 and the second region 212 of the display 210 may be respectively disposed in the first housing 221 and the second housing 222 to face in opposite directions to each other.

The display 210 may be formed as a flexible display. The display 210 may be folded by the folding operation of the electronic device 201 and may be unfolded by the unfolding operation of the electronic device 201.

FIG. 2A is a view illustrating a state where the electronic device 201 is fully folded. FIG. 2B is a view illustrating a state where the electronic device 201 is fully unfolded. In a state where the electronic device 201 is fully folded, an angle between the first housing 221 and the second housing 222 may be 0°. In a state where the electronic device 201 is fully unfolded, an angle between the first housing 221 and the second housing 222 may be 180°.

Referring to FIG. 2A, when the electronic device 201 is fully folded, the electronic device 201 may display content by using the first region 211 of the display 210. Referring to FIG. 2B, when the electronic device 201 is fully unfolded, the electronic device 201 may display content by using the first region 211 and the second region 212 of the display 210. Although not shown in FIGS. 2A and 2B, the electronic device 201 may display content by using at least one of the first region 211 and the second region 212 of the display 210 depending on the angle formed by the first housing 221 and the second housing 222. The electronic device 201 may display an application execution screen, a home screen, a lock screen, or an always-on-display (AOD) screen in the first region 211 and the second region 212 by a processor (e.g., the processor 120 in FIG. 1) of the electronic device 201.

FIGS. 2A and 2B illustrate an out-folding method in which the display 210 is folded outward such that the first housing 221 and the second housing 222 face each other when the electronic device 201 is fully folded. However, the disclosure is not limited thereto. For example, the electronic device 201 may be folded in an in-folding method or in an in/out-folding method. The in-folding method may be a method of folding the display 210 inward such that the first region 211 and the second region 212 of the display 210 face each other. The in-folding-type electronic device 201 may further include an auxiliary display positioned on the rear surface of the electronic device. When the electronic device is folded in the in-folding method, the auxiliary display may display content such as an application execution screen, a home screen, a lock screen, or an AOD screen. The in/out-folding method may refer to a method of folding a part of the display 210 outward and folding the remaining part of the display 210 inward.

FIGS. 2A and 2B illustrate that the foldable electronic device 201 is symmetrically folded while the hinge structure 223 is formed in a central region of the foldable electronic device 201. However, the disclosure is not limited thereto. For example, the first housing 221 and the second housing 222 may be folded asymmetrically (e.g., a shape in which the second housing 222 is larger than the first housing 221). In this case, the hinge structure 223 may be positioned in a non-central region.

In an embodiment, it is illustrated that the foldable electronic device 201 is folded once. However, it is not limited thereto. The foldable electronic device 201 may be a multi-foldable device. For example, the foldable electronic device 201 may include first housing, second housing, and third housing. A first hinge structure may be formed between the first housing and the second housing. A second hinge structure may be formed between the second housing and the third housing.

The display 210 can receive input from a stylus pen. The display 210 can include a sensor panel 300 that detects contact and the location of contact by the stylus pen.

Figure 3:
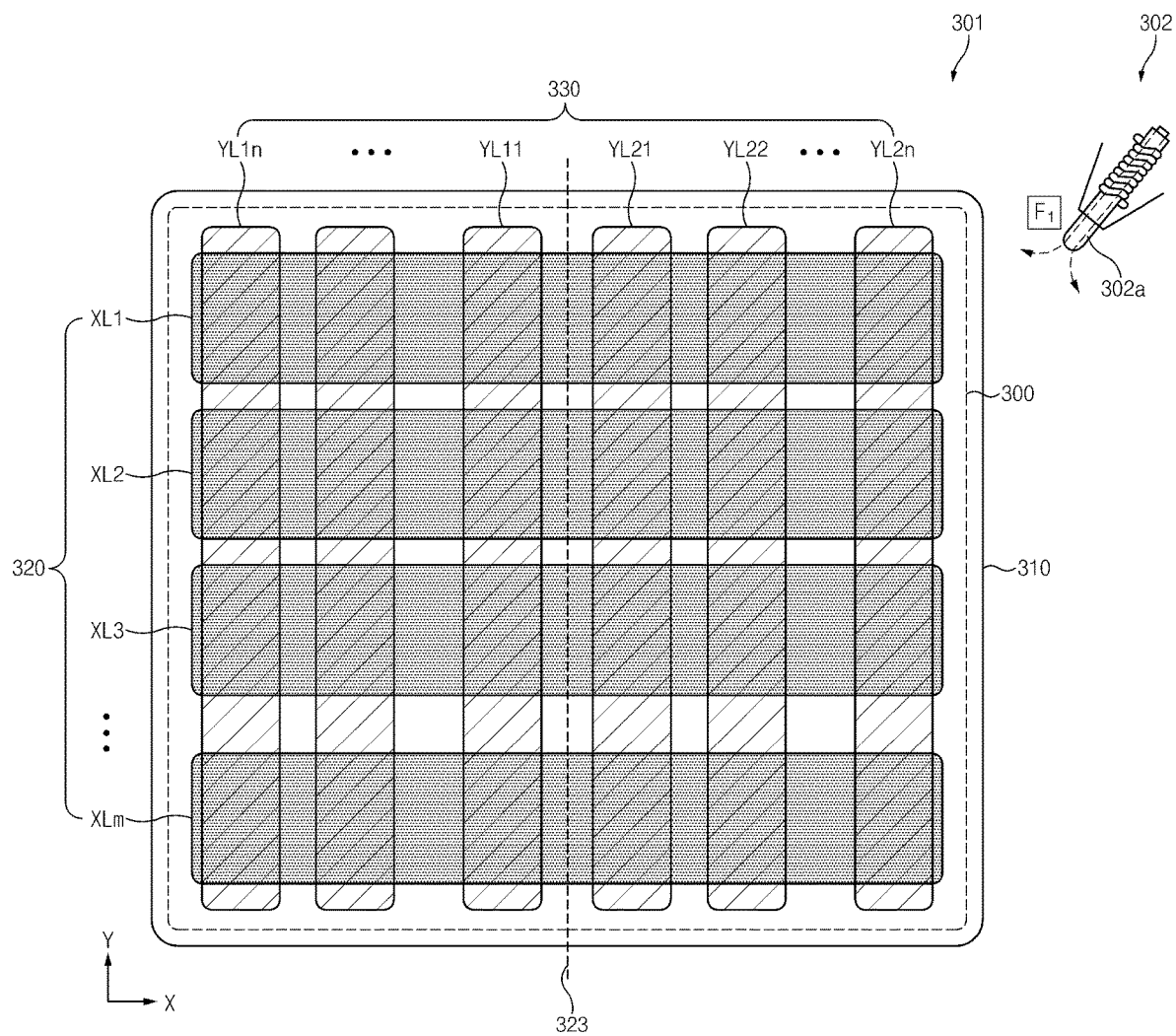
FIG. 3 is a diagram illustrating a sensor panel of an electronic device, according to certain embodiments.

FIG. 3 is a view illustrating a sensor panel included in a foldable electronic device, according to certain embodiments.

Referring to FIG. 3, a sensor panel 300 included in a foldable electronic device 301 may be disposed under a flexible display 310. The sensor panel 300 may be formed adjacent to the flexible display 310 separately from the flexible display 310 or may be embedded in the flexible display 310. The sensor panel 300 may be formed in a foldable form like the flexible display 310. For example, the sensor panel 300 may be formed in a form of a flexible printed circuit board (FPCB).

The sensor panel 300 can detect contact, or the proximity of stylus pen 302, as well as the location of the contact, and proximate location. For purposes of the document, the term "contact" when used in the context of the stylus pen shall also include placement of the stylus pen 302 sufficiently close to the flexible display 310 so as to be detected.

The sensor panel 300 includes a grid formed by a vertical channel group 330 and a horizontal channel group 320. The vertical channels YL1$n$ ... YL2$n$ and the horizontal channels XL1 ... XLm are coils. The stylus pen 302 generates an electromagnetic field. When the stylus pen 302 makes contact with the sensor group 330, the electromagnetic field includes a current, or a change in current, in some of the vertical channels YL21 ... YL2$n$ and some of the horizontal channels XL1 ... XLm. The magnitude of the current or change in current is highest at the channels that are closest to the stylus pen 302.

Accordingly, the sensor panel 300 can deem the intersection of the horizontal channel and the vertical channel with the highest current or change in current as the location of the contact.

The sensor panel 300 may be a digitizer panel for recognizing a stylus pen 302. For example, the sensor panel 300 may be an electromagnetic resonance (EMR) digitizer panel for detecting an input of the stylus pen 302.

The sensor panel 300 may include at least one loop coil capable of generating a magnetic field for tracking a position of a tip 302$a$ of the stylus pen 302. One loop coil or a plurality of loop coils may constitute one channel.

According to certain embodiments, the sensor panel 300 may include a vertical channel group 330 extending in a vertical direction and a horizontal channel group 320 extending in a horizontal direction (e.g., X direction) different from the first direction (e.g., Y direction). The vertical channel group 330 and the horizontal channel group 320 may be arranged in a matrix shape by crossing each other.

The vertical channel group 330 includes a plurality of first vertical channels (YL1 or YL11, YL12, ..., YL1$n$), each of which forms a loop coil, and a plurality of second vertical channels (YL2 or YL21, YL22, ..., YL2$n$), each of which forms a loop coil. The plurality of first vertical channels (YL11, YL12, ..., YL1$n$) and the plurality of second vertical channels (YL21, YL22, ..., YL2$n$) may extend in the first direction. The first vertical channels (YL11, YL12, ..., YL1$n$) and the second vertical channels (YL21, YL22, ..., YL2$n$) may be divided with respect to a folding axis 323. The number of first vertical channels (YL11, YL12, ..., YL1$n$) may be identical to or different from the number of second vertical channels (YL21, YL22, ..., YL2$n$). The first vertical channels (YL11, YL12, ..., YL1$n$) and the second vertical channels (YL21, YL22, ..., YL2$n$) may be disposed in different housings with respect to the folding axis 323. For example, the first vertical channels (YL11, YL12, ..., YL1$n$) may be positioned in the first housing (e.g., the second housing 222 in FIG. 2). The second vertical channels (YL21, YL22, ..., YL2$n$) may be positioned in the second housing (e.g., the first housing 221 of FIG. 2). The first vertical channels (YL11, YL12, ..., YL1$n$) may overlap a first region (e.g., the second region 212 of FIG. 2) of a display (e.g., the display 210 in FIG. 2). The second vertical channels (YL21, YL22, ..., YL2$n$) may overlap a second region (e.g., the first region 211 in FIG. 2) of the display.

The horizontal channel group 320 may include a plurality of horizontal channels (XL1, XL2, ..., XLm), each of which forms a loop coil. The horizontal channels (XL1, XL2, ..., XLm) may extend in the second direction substantially perpendicular to the first direction. A part of each of the plurality of horizontal channels (XL1, XL2, ..., XLm) may be arranged in the first housing. The remaining part of each of the plurality of horizontal channels (XL1, XL2, ..., XLm) may be arranged in the second housing. For example, a part of each of the plurality of horizontal channels (XL1, XL2, ..., XLm) crossing the first vertical channels (YL11, YL12, ..., YL1$n$) may be arranged in the first housing. The remaining part of each of the plurality of horizontal channels (XL1, XL2, ..., XLm) crossing the second vertical channels (YL21, YL22, ..., YL2$n$) may be arranged in the second housing.

When the stylus pen 302 contacts or approaches the sensor panel 300 including the vertical channel group 330 and the second channel group 320, a resonance circuit included in the stylus pen 302 may generate a current, and then may form a magnetic field by the generated current. The magnitude of the signal flowing into at least one of the plurality of first vertical channels YL1 and the plurality of second vertical channels YL2, which are included in the vertical channel group 330, and at least one of the plurality of horizontal channels XL included in the horizontal channel group 320 may be changed by the formed magnetic field. The position of the stylus pen 302 may be detected through a position at which the third conductive channel intersects one of the first vertical channels YL1 and the second vertical channels YL2, in one of which the magnitude of a signal is changed. For example, when the stylus pen 302 approaches the sensor panel 300, the magnitude of the signal flowing through the horizontal channels XL and one of the first vertical channels YL1 and the second vertical channels YL2, one of which corresponds to the position approached by the stylus pen 302, may be increased.

It is noted that the contact position may be ambiguous without knowing the folding state. For example, vertical channel YL11 and horizontal channels XL1 have the highest induced signal. However, in the unfolded state, the contact point is at the top center, while in the folded state, the contact point is at the top right.

The foldable electronic device 301 may recognize a folding state by using the vertical channel group 330 positioned in different housing portions with respect to the folding axis 323. For example, the foldable electronic device 301 may detect a folding state by using at least one first vertical channel YL1 and at least one second vertical channel YL2.

One of the at least one first vertical channels YL1 disposed in the first housing and the at least one second vertical channels YL2 disposed in the second housing may transmit a signal for detecting the folding state. The other one may receive the signal for detecting the folding state. For example, the at least one first vertical channel YL1 may operate as a transmitting coil that transmits a folding detection signal for detecting the folding state. The at least one second vertical channel YL2 may operate as a receiving coil that receives a folding detection signal for detecting the folding state. An angle of the electronic device in an unfolded state, a folded state, or a partially-folded state may be determined based on at least one of the frequency, intensity and pattern of the received folding detection signal.

The location and intensity of contact and other information from the stylus pen is measured based on expected characteristics of the electronic device. However, due to variances in the components from product to product, as well as changes that may occur over time, there may be a deviance in the signal resultant from a given contact of the stylus. That is, the same contact by a stylus, with the same pressure at the same point, and/or button press may result in different signals in the vertical channel group 330 and horizontal channel group 320. This may be because the actual characteristics of the electronic device may deviate from the expected characteristics of the electronic device.

Accordingly, the processor can transmit a deviation detection signal from one of the first vertical channels to one of the second vertical channels. In certain embodiments, the deviation detection signal can have known characteristics or have an expected response. The actual response to the deviation detection signal, the received deviation signal by one of the second vertical channels can be used to deduce the transfer characteristics of the electronic device, as it actually is, including the specific variances unique to the electronic device. With this information, from a signal resultant from contact by stylus, the location, and pressure of contact by the stylus pen can be also be determined based on the actual characteristics, including the specific variances unique to the electronic device.

In certain embodiments, the electronic device can maintain a table of compensation values that correspond to a range of received deviation detections signals. The compensation values, when added to the measured contact position and pressure by the stylus pen compensate for error due to the difference or deviation of the expected characteristics of the electronic device, and the actual characteristics of the electronic device.

The foldable electronic device 301 may measure the deviation of the electronic device by using the vertical channel group 330 positioned in different housing portions with respect to the folding axis 323. For example, the foldable electronic device 301 may measure the deviation of the electronic device by using the at least one first vertical channel YL1 and the at least one second vertical channel YL2, which are included in the vertical channel group 330. When the deviation is measured, the at least one first vertical channel YL1 disposed in the first housing and the at least one second vertical channel YL2 disposed in the second housing may be disposed to face each other.

One of the at least one first vertical channel YL1 disposed in the first housing and the at least one second vertical channel YL1 disposed in the second housing may transmit a signal for measuring a deviation from expected characteristics of the electronic device. The other one may receive the signal for measuring the deviation feature of the electronic device. For example, the at least one first vertical channel YL1 may operate as a transmitting coil that transmits a deviation detection signal for measuring the deviation feature of the electronic device. The at least one second conductive channel YL2 may operate as a receiving coil that receives the deviation detection signal for measuring the deviation feature of the electronic device. The deviation feature of the electronic device may be determined based on at least one of the frequency, intensity, and pattern of the received deviation detection signal.

According to certain embodiments, the foldable electronic device 301 may recognize the input of the stylus pen by using the vertical channel group 330 including at least one loop coil and the horizontal channel group 320 including at least one loop coil. Input information of at least one of a position (or coordinates) of the stylus pen 302, a button press, a touch, and a pen pressure may be detected. For example, the vertical channel group 330 and the horizontal channel group 320 may transmit and receive an input detection signal for recognizing an input of the stylus pen 302 with the stylus pen 302.

Figure 4:
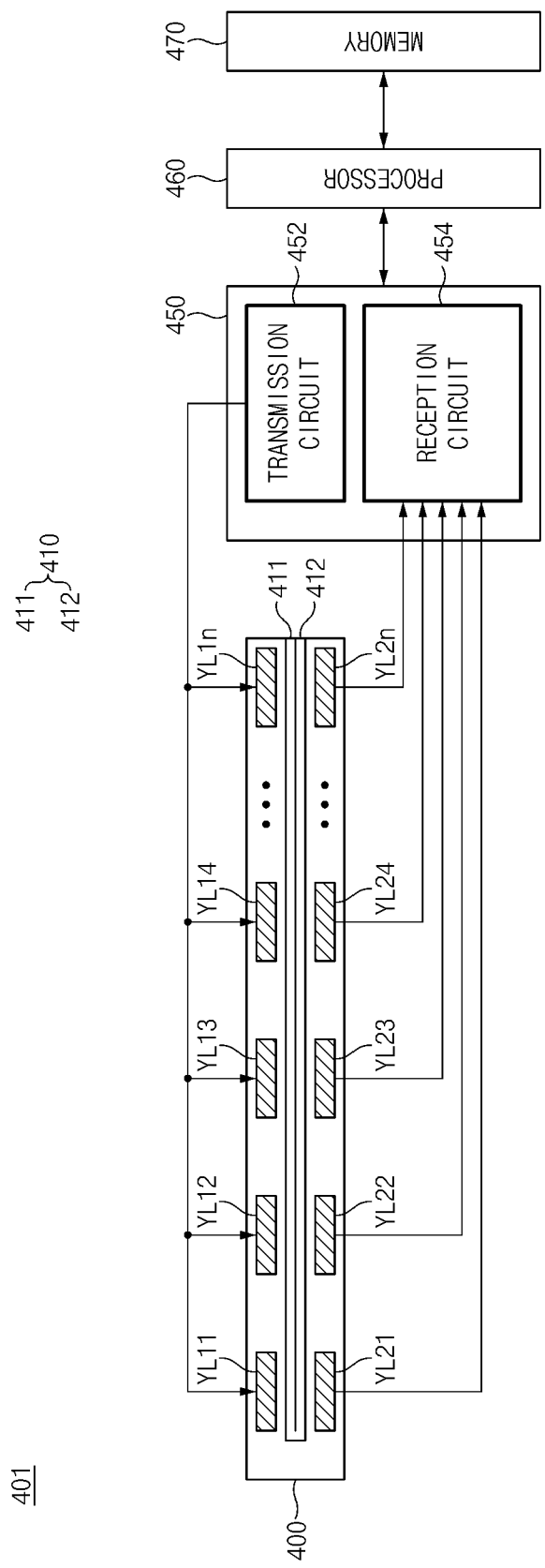
FIG. 4 is a view for describing a configuration of a foldable electronic device, according to certain embodiments.

FIG. 4 is a view for describing a configuration of a foldable electronic device, according to certain embodiments.

A foldable electronic device 401 (e.g., the electronic device 101 of FIG. 1) illustrated in FIG. 4 may include a sensor panel 400, a display 410, a control unit 450, and a processor 460 (e.g., the processor 120 in FIG. 1), and a memory 470 (e.g., the memory 130 of FIG. 1). As shown in FIG. 3, the sensor panel 300 shown in FIG. 4 includes the plurality of first vertical channels YL1, the plurality of second vertical channels YL2, and a plurality of horizontal channels (e.g., the horizontal channels XL in FIG. 3). However, for convenience of description, the plurality of horizontal channels XL will be omitted.

The sensor panel 400 may include the first vertical channels (YL11, YL12, ..., YL1n) and the second vertical channels (YL21, YL22, ..., YL2n). When the folding state and deviation feature of the foldable electronic device 401 are measured, one of the first vertical channels (YL11, YL12, ..., YL1n) and the second vertical channels (YL21, YL22, ..., YL2n) may operate as a transmitting coil. When the folding state and deviation feature of the foldable electronic device 401 are measured, the other of the first vertical channels (YL11, YL12, ..., YL1n) and the second vertical channels (YL21, YL22, ..., YL2n) may operate as a receiving coil.

The display 410 may include a first region 411 (e.g., the first region 211 of FIG. 2) and a second region 412 (e.g., the second region 212 of FIG. 2) disposed in different housings from each other. According to certain embodiments, in a state where the first region 411 and the second region 412 are arranged to face each other, the foldable electronic device 401 may detect a deviation from expected characteristics of the foldable electronic device 401.

The control unit 450 may transmit a signal to the sensor panel 400 and may deliver a signal received through the sensor panel 400 to the processor 460. The control unit 450 may include a transmission circuit 452 and a reception circuit 454.

The transmission circuit 452 may generate a folding detection signal for detecting a folding state of the foldable electronic device 401, a deviation detection signal for detecting the deviation feature of the foldable electronic device 401, and/or an input detection signal for detecting an operation of a stylus pen (e.g., the stylus pen 302 in FIG. 3) depending on a specified frequency. One signal of the folding detection signal, the deviation detection signal, and the input detection signal may be identical to or different from the other two signals or another signal.

The transmission circuit 452 may deliver the generated folding detection signal, the generated deviation detection signal, and/or the generated input detection signal to the sensor panel 400. When the folding state is measured, the transmission circuit 452 may transmit the folding detection signal to the first vertical channels (YL11, YL12, ..., YL1n). When a deviation from expected characteristics state is measured (or in an offset measurement mode), the transmission circuit 452 may transmit a deviation detection signal to the first vertical channels (YL11, YL12, ..., YL1n). When an input of a stylus pen is recognized (or in an input measurement mode), the transmission circuit 452 may transmit the input detection signal to at least one of the first vertical channels (YL11, YL12, ..., YL1n), the second vertical channels (YL21, YL22, ..., YL2n), and the horizontal channels.

The reception circuit 454 may deliver a signal received through the sensor panel 400 to the processor 460. When the folding state is measured, the reception circuit 454 may deliver the folding detection signal received through the second vertical channels (YL21, YL22, ..., YL2n) to the processor 460. When the deviation feature state is measured, the reception circuit 454 may deliver the deviation detection signal received through the second vertical channels (YL21, YL22, ..., YL2n) to the processor 460. When an input of a stylus pen is recognized, the reception circuit 454 may deliver, to the processor 460, the input detection signal received through at least one of the first vertical channels (YL11, YL12, ..., YL1n), the second vertical channels (YL21, YL22, ..., YL2n), and the horizontal channels. The reception circuit 454 may filter the folding detection signal, the deviation detection signal, and/or the input detection signal depending on a specified frequency band and then may deliver the filtered signal to the processor 460.

The processor 460 may detect a folding state of the foldable electronic device 401 through the folding detection signal received through the second vertical channels (YL21, YL22, ..., YL2n). In the offset measurement mode, the processor 460 may detect the deviation of the foldable electronic device 401 through the deviation detection signal received through the second vertical channels (YL21, YL22, ..., YL2n). In the input measurement mode, the processor 460 may correct the input of the stylus pen by applying the compensation value for the deviation of the foldable electronic device 401 stored in the memory 470 to the input of the received stylus pen. The processor 460 may detect a pen pressure and/or at least one of an actual frequency and a phase of the received electromagnetic signal by applying a compensation value to the received electromagnetic signal of the stylus pen.

At least one lookup table for compensating for the deviation of an electronic device may be stored in the memory 470. An experimentally specified compensation value may be stored to compensate for the deviation of the electronic device in the lookup table. The lookup table may apply compensation values to all input positions of the stylus pen. In the lookup table, a unit of a compensation value may be determined in consideration of accuracy and user environments. The lookup table may be generated during manufacture of the foldable electronic device or downloaded through data communication and then may be stored in the memory 470.

According to certain embodiments, in the offset measurement mode, the deviation feature of the foldable electronic device 401 may be detected by using a deviation detection signal having a fixed frequency. In a state where the first vertical channels (YL11, YL12, ..., YL1n) and the second vertical channels (YL21, YL22, ..., YL2n) are arranged to face each other, the processor 460 may detect the deviation feature of the foldable electronic device 401. The processor 460 may transmit a deviation detection signal that is an electromagnetic field signal (or an electromagnetic signal) having a fixed frequency to each of the first vertical channels (YL11, YL12, ..., YL1n). Each of the second vertical channels (YL21, YL22, ..., YL2n) may receive a deviation detection signal that is an electromagnetic field signal. For example, the processor 460 may measure the intensity of each of the deviation detection signals received through the second vertical channels (YL21, YL22, ..., YL2n) and then may determine a deviation from expected characteristics of the foldable electronic device 401 by comparing the measured intensity with a reference intensity. The compensation value for the deviation feature determined in the offset measurement mode may be generated by a method such as a linear interpolation method. The generated compensation value may be applied to the input of the stylus pen in the input measurement mode, and thus the input of the stylus pen may be corrected. According to an embodiment, in the offset measurement mode in which a deviation detection signal having a fixed frequency is used, the reference intensity, which is a criterion for determining the deviation feature, may be determined through a plurality of standard samples. For example, in a state where each of the plurality of standard samples, each of which is the foldable electronic device 401 is fully-unfolded, a phase value of a resonance signal may be measured through a stylus pen at the same position of each of a plurality of standard samples. A shielding sheet having different shielding performance may be attached to the plurality of standard samples. Magnetic components included in the shielding sheet may cause the deviation of a foldable electronic device. Accordingly, different deviations may occur in the plurality of standard samples to each of which a shielding sheet having different shielding performance is attached. A resonance signal, which has a correlation between a phase value and intensity, from among a plurality of resonance signals measured from the plurality of standard samples may be extracted. In a state where a plurality of standard samples are fully folded, a sample signal, which is the extracted resonance signal, may be transmitted to each of the first vertical channels (YL11, YL12, ..., YL1n). Each of the second vertical channels (YL21, YL22, ..., YL2n) may receive the sample signal, which is an electromagnetic field signal. The intensity of the received sample signal may be used as a reference intensity. The frequency of the received sample signal may be used as a fixed frequency of the deviation detection signal.

According to certain embodiments, in the offset measurement mode, the deviation feature of the foldable electronic device 401 may be detected by using a plurality of deviation detection signals having different frequencies. In a state where the first vertical channels (YL11, YL12, ..., YL1n) and the second vertical channels (YL21, YL22, ..., YL2n) are arranged to face each other, the processor 460 may detect the deviation feature of the foldable electronic device 401. A plurality of deviation detection signals having different frequencies within a specific range may be sequentially transmitted to the first vertical channels (YL11, YL12, ..., YL1n). Each of the second vertical channels (YL21, YL22, ..., YL2n) may sequentially receive a plurality of deviation detection signals. The processor 460 may compare a reference frequency with a frequency of a deviation detection signal, which has the greatest signal intensity, from among a plurality of deviation detection signals received through the second vertical channels (YL21, YL22, ..., YL2n), and then may determine a deviation from expected characteristics (or a deviation value) of the foldable electronic device 401. A compensation value stored in a lookup table may be selected depending on the deviation feature determined in the offset measurement mode. The selected compensation value may be applied to the input of a stylus pen in the input measurement mode, and thus the input of the stylus pen may be corrected. According to an embodiment, in the offset measurement mode in which a plurality of deviation detection signals having different frequencies are used, the reference frequency, which is a criterion for determining the deviation feature, may be determined through a plurality of standard samples having different deviations. For example, in a state where each of the plurality of standard samples, each of which is a foldable electronic device, is fully unfolded, a phase value of a resonance signal may be measured through a stylus pen at the same position of each of a plurality of standard samples. The frequency corresponding to the measured phase value may be changed to a plurality of frequencies within a specific range. In a state where a plurality of standard samples are fully folded, a sample signal of each of the changed frequencies may be transmitted to each of the first vertical channels (YL11, YL12, ..., YL1n), and each of the second vertical channels (YL21, YL22, ..., YL2n) may receive the sample signal, which is an electromagnetic field signal. A frequency of a sample signal, which has the greatest signal intensity, from among the received sample signals may be used as a reference frequency.

According to certain embodiments, the processor 460 may measure the phase of each of the deviation detection signals received through the second vertical channels (YL21, YL22, ..., YL2n) and then may determine a deviation from expected characteristics depending on the difference between the measured phase and the reference phase. The phase may be obtained by analyzing the change in frequency of each of the deviation detection signals received through the second vertical channels (YL21, YL22, ..., YL2n). The reference phase is a phase measured from a standard sample, and may be appropriately adjusted depending on the features, standards, and/or specifications of the electronic device.

According to certain embodiments, as shown in FIG. 4, the control unit 450 may be formed as a component separate from the processor 460, or may be integrated with the processor 460 as a single component.

According to certain embodiments, to update the deviation feature of the foldable electronic device 401, the processor 460 may control the foldable electronic device 401 to periodically operate in the offset measurement mode. In the offset measurement mode, the processor 460 may control the control unit 450 to operate the sensor panel 400 in the offset measurement mode, and then may periodically update a deviation from expected characteristics by sensing the deviation feature through the first vertical channels and the second vertical channels. For example, when the fully folded electronic device 401 is in a standby state, the processor 460 may operate in the offset measurement mode and then may update the deviation feature of the electronic device 401.

Figure 5A:
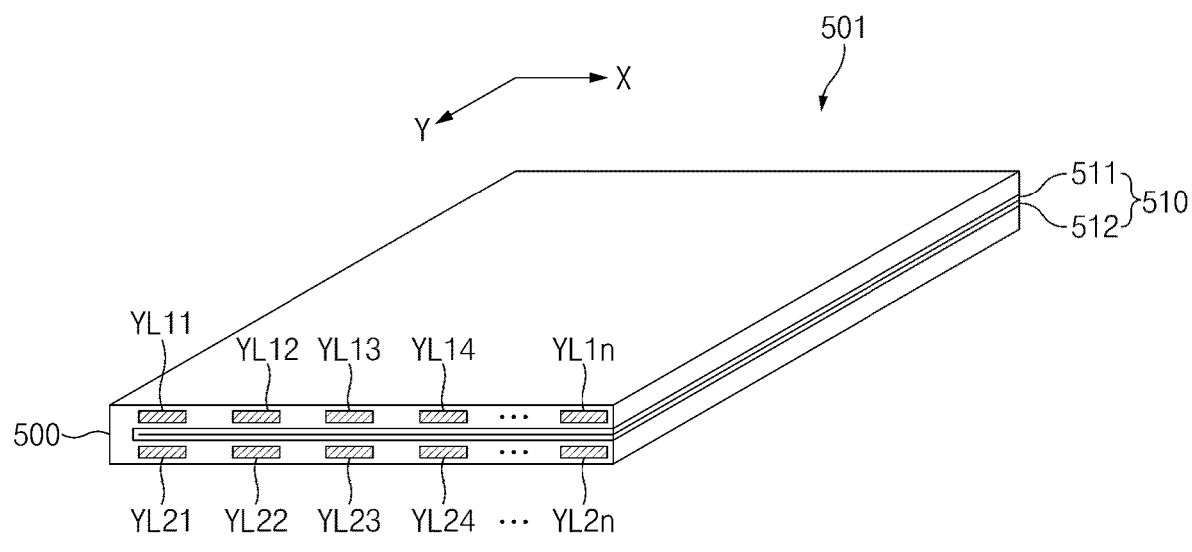
FIGS. 5A to 5C are diagrams for describing an operation of detecting folding and unfolding states of a foldable electronic device, according to certain embodiments.
Figure 5A:
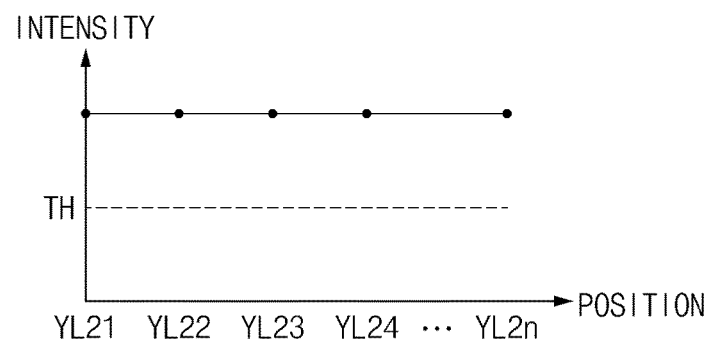
Figure 5B:
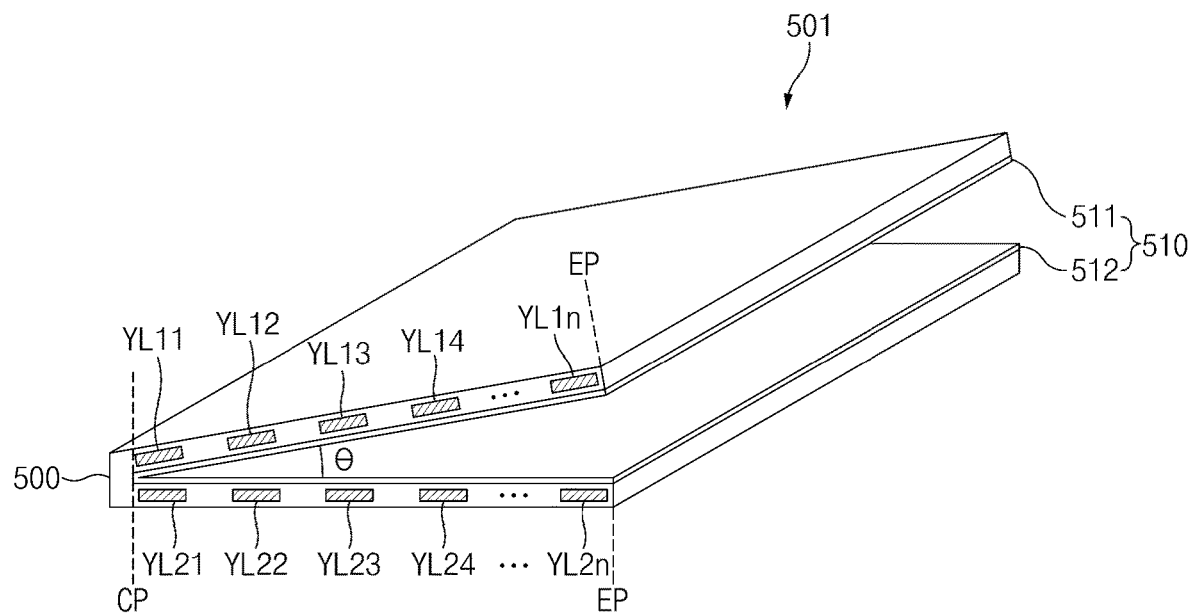
Figure 5B:
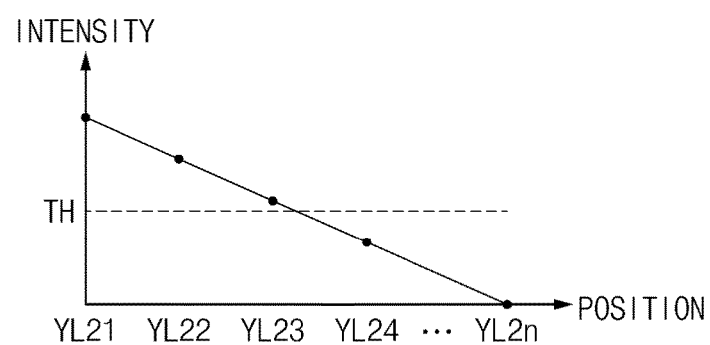
Figure 5C:
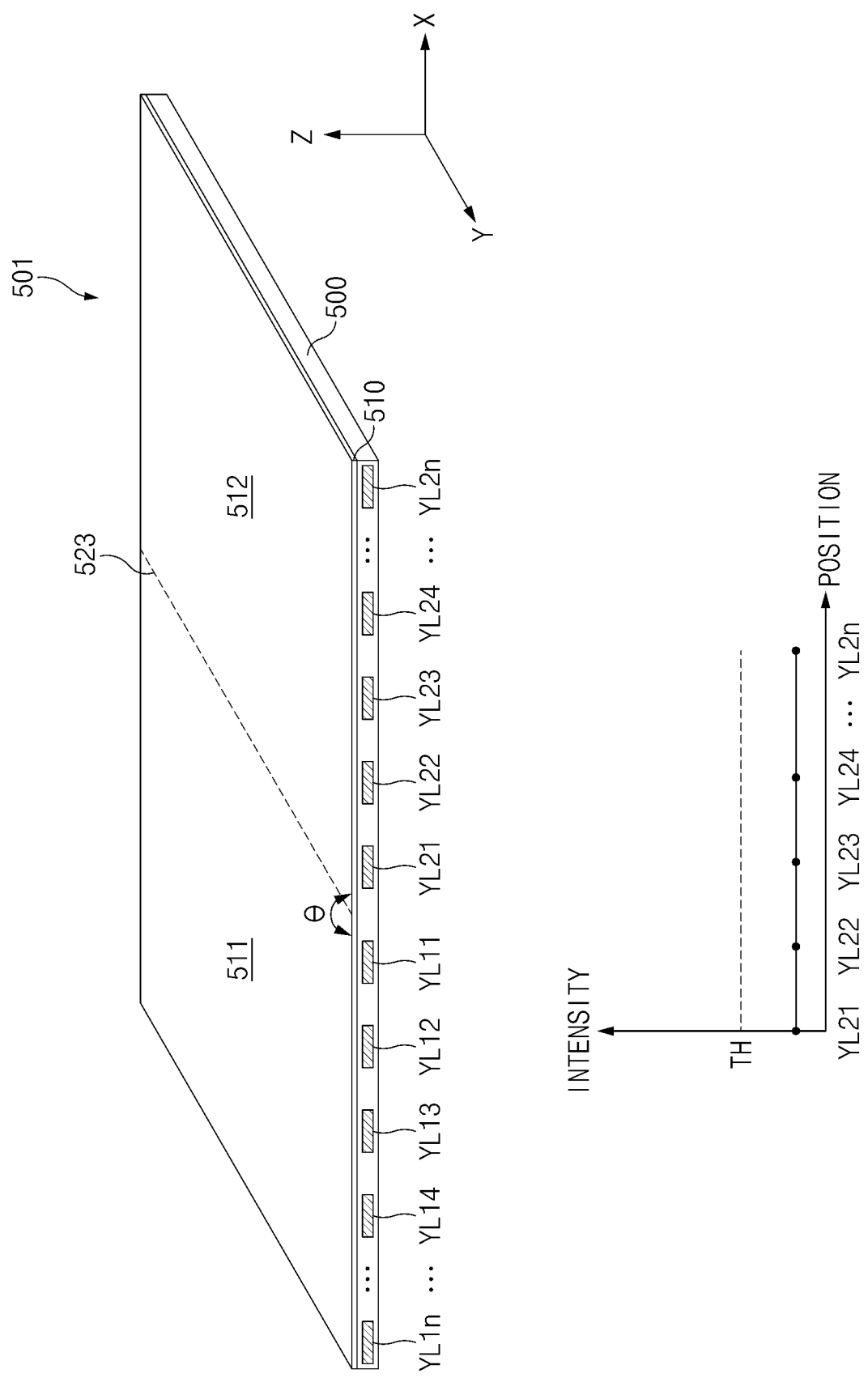

FIGS. 5A to 5C are diagrams for describing an operation of detecting folding and unfolding states of a foldable electronic device, according to certain embodiments.

As shown in FIG. 5A, when a foldable electronic device 501 (e.g., the electronic device 101 of FIG. 1) is fully folded, the plurality of first vertical channels (YL11, YL12, ..., YL1n) and the plurality of second vertical channels (YL21, YL22, ..., YL2n) may be disposed to face each other. The plurality of first vertical channels (YL11, YL12, ..., YL1n) and the plurality of second vertical channels (YL21, YL22, ..., YL2n) may be arranged to face each other at a relatively close distance with a display 510 including a first region 511 and a second region 512 interposed therebetween. Electromagnetic induction is generated between the plurality of first vertical channels (YL11, YL12, ..., YL1n) and the plurality of second vertical channels (YL21, YL22, ..., YL2n), which face each other at a relatively close distance, and thus a processor may receive a folding detection signal having a relatively-large intensity. Accordingly, as shown in FIG. 5A, the folding detection signals received through the plurality of second vertical channels (YL21, YL22, ..., YL2n) are distributed in an upper limit region with respect to a threshold value TH, and thus the processor (e.g., the processor 460 of FIG. 4) may determine that the foldable electronic device 501 is fully folded.

As shown in FIG. 5B, when the foldable electronic device 501 is partially folded, an angle θ is formed between the first region 511 and the second region 512 of the display 510. The intensity of folding detection signal may gradually increase from a center part CP of the display 510 to an edge part EP of the display 510. Moreover, a separation distance between the plurality of first vertical channels (YL11, YL12, ..., YL1n) and the plurality of second vertical channels (YL21, YL22, ..., YL2n) may gradually increase from the center CP of the display 510 to the edge part EP of the display 510. The processor may receive a folding detection signal having a relatively-large intensity through the plurality of second vertical channels (YL21, YL22, ..., YL2n) spaced from the first vertical channels (YL11, YL12, ..., YL1n) at a relatively close distance. The processor may receive a folding detection signal having a relatively-small intensity through the plurality of second vertical channels (YL21, YL22, . . . , YL2n) spaced from the first vertical channels (YL11, YL12, . . . , YL1n) at a relatively long distance. Accordingly, as shown in FIG. 5B, folding detection signals received through the plurality of second vertical channels (YL21, YL22, . . . , YL2n) are distributed in an upper limit region and a lower limit region with respect to the threshold value TH, and thus the processor may determine that the foldable electronic device is partially folded.

As shown in FIG. 5C, when the foldable electronic device 401 is fully unfolded, the plurality of first vertical channels (YL11, YL12, . . . , YL1n) and the plurality of second vertical channels (YL21, YL22, . . . , YL2n) may be arranged not to face each other. When the foldable electronic device 401 is unfolded, the first region and the second region may be arranged at an angle θ of 90° to 180° with respect to a folding axis 523 (e.g., the folding axis 323 of FIG. 3). It is difficult to generate electromagnetic induction between the plurality of first vertical channels (YL11, YL12, . . . , YL1n) and the plurality of second vertical channels (YL21, YL22, . . . , YL2n), and thus the processor may receive a folding detection signal of relatively-small intensity or may fail to receive the folding detection signal. Accordingly, as shown in FIG. 5C, folding detection signals received through the plurality of second vertical channels (YL21, YL22, . . . , YL2n) are distributed in the lower limit region with respect to the threshold value TH, and thus the processor may determine that the foldable electronic device is unfolded.

According to an embodiment, the processor may determine the folding state of the foldable electronic device 501 based on a cumulative distribution of intensity values of a plurality of folding detection signals. According to another embodiment, the processor may determine the folding state of the foldable electronic device 501 based on an average value of intensity values of a plurality of folding detection signals. When the average value of the intensity values of the plurality of folding detection signals is not less than a threshold value, the processor may determine that the foldable electronic device 501 is fully folded.

According to certain embodiments, in addition to the above-described sensor panel, the folding state of the foldable electronic device may be detected by using a sensor of the foldable electronic device. For example, the foldable electronic device according to certain embodiments may detect the folding state of the foldable electronic device by using various sensors such as a hall sensor or a motion sensor (e.g., a 6-axis motion sensor) included in a sensor module (e.g., the sensor module 176 of FIG. 1). The hall sensor may detect the folding state of the foldable electronic device based on the movement of a hinge structure (e.g., the hinge structure 223 in FIG. 2). The motion sensor may be implemented with at least one of a gyro sensor, an acceleration sensor, and a geomagnetic sensor included in the sensor module (e.g., the sensor module 176 of FIG. 1). The motion sensor may detect the folding state of the foldable electronic device by detecting speed changes associated with the movement of first housing and second housing. At least one of the hall sensor and the motion sensor may be arranged in at least one of the first housing and the second housing.

Figure 6A:
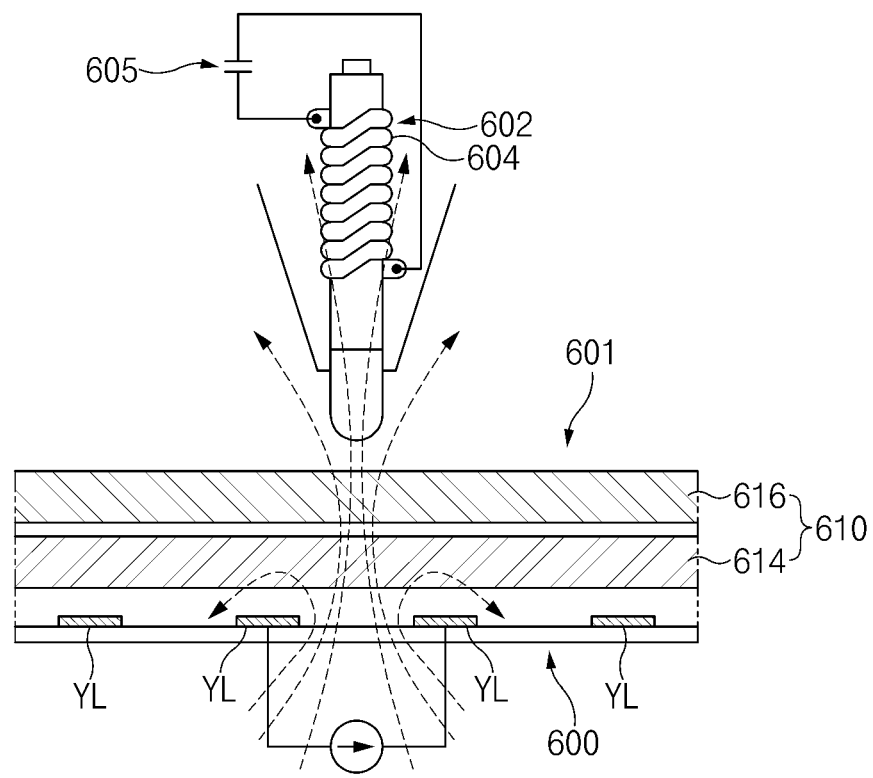
FIGS. 6A and 6B are diagrams for describing an operation of receiving a signal from a stylus pen by using a sensor panel in a foldable electronic device, according to certain embodiments.
Figure 6A:
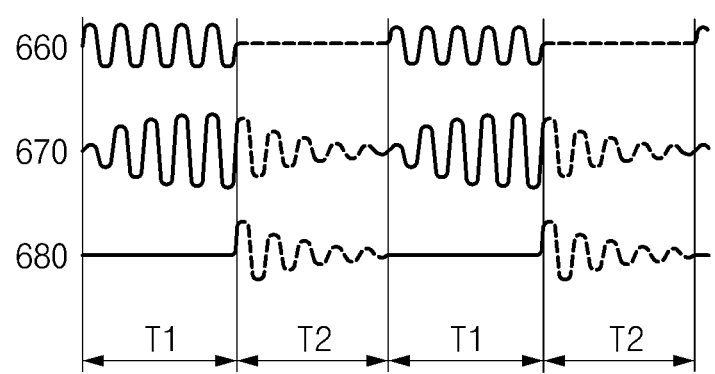
Figure 6B:
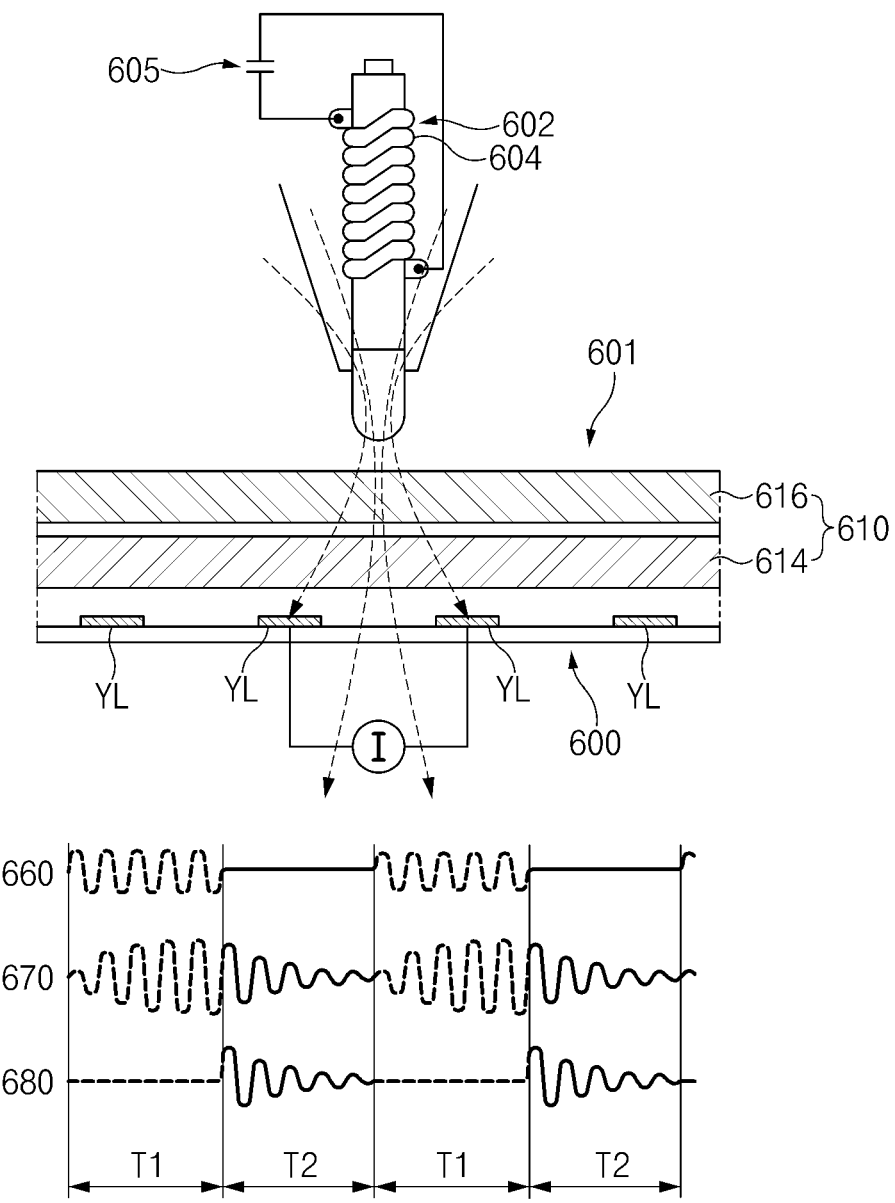

FIGS. 6A and 6B are diagrams for describing an operation of receiving a signal from a stylus pen by using a sensor panel in a foldable electronic device, according to certain embodiments.

Referring to FIGS. 6A and 6B, in a foldable electronic device 601 (e.g., the electronic device 101 of FIG. 1) according to certain embodiments, a sensor panel 600 may be disposed under a display 610 including a cover window 616 and a display panel 614. A stylus pen 602 approaching the display 610 at a predetermined distance may include a resonance circuit including at least one inductor 604 and at least one capacitor 605 connected in parallel to the inductor 604.

When the stylus pen 602 approaches or contacts the display 610 at a specific distance, a processor may detect a position of the stylus pen 602 by detecting a signal flowing into the plurality of channels YL (e.g., the first vertical channel YL1, the second conductive channel YL2, and the third conductive channel XL in FIG. 3) included in the sensor panel 600.

For example, referring to FIG. 6A, in a first section T1, a first electromagnetic signal 660 may be generated through the sensor panel 600 by applying a current to at least one of the plurality of channels YL included in the sensor panel 600. The generated first electromagnetic signal 660 is delivered to the stylus pen 602, and thus a primary resonance may be induced through the resonant circuit in the stylus pen 602. Accordingly, a second electromagnetic signal 670 may be generated. The second electromagnetic signal 670 distinct from the first electromagnetic signal 660 may be generated by the primary resonance.

Referring to FIG. 6B, in a second section T2 after the first section T1, a current flowing into at least one of a plurality of channels of the sensor panel 600 may be blocked. Accordingly, the second electromagnetic signal 670 induced by the resonant circuit of the stylus pen 602 remains in a form of maintenance and attenuation. A secondary resonance may be induced to the sensor panel 600 by the remaining second electromagnetic signal 670, and thus a third electromagnetic signal 680 may be generated. The third electromagnetic signal 680 distinct from the second electromagnetic signal 670 may be generated by the secondary resonance. The processor may recognize an input of the stylus pen 602 by measuring a current (or voltage) induced by the secondary resonance. For example, the processor may obtain information about the frequency or phase of the third electromagnetic signal 680 by measuring the current (or voltage) induced by the secondary resonance. The input of the stylus pen 602 may be recognized through information about the frequency or phase of the third electromagnetic signal 680.

Figure 7:
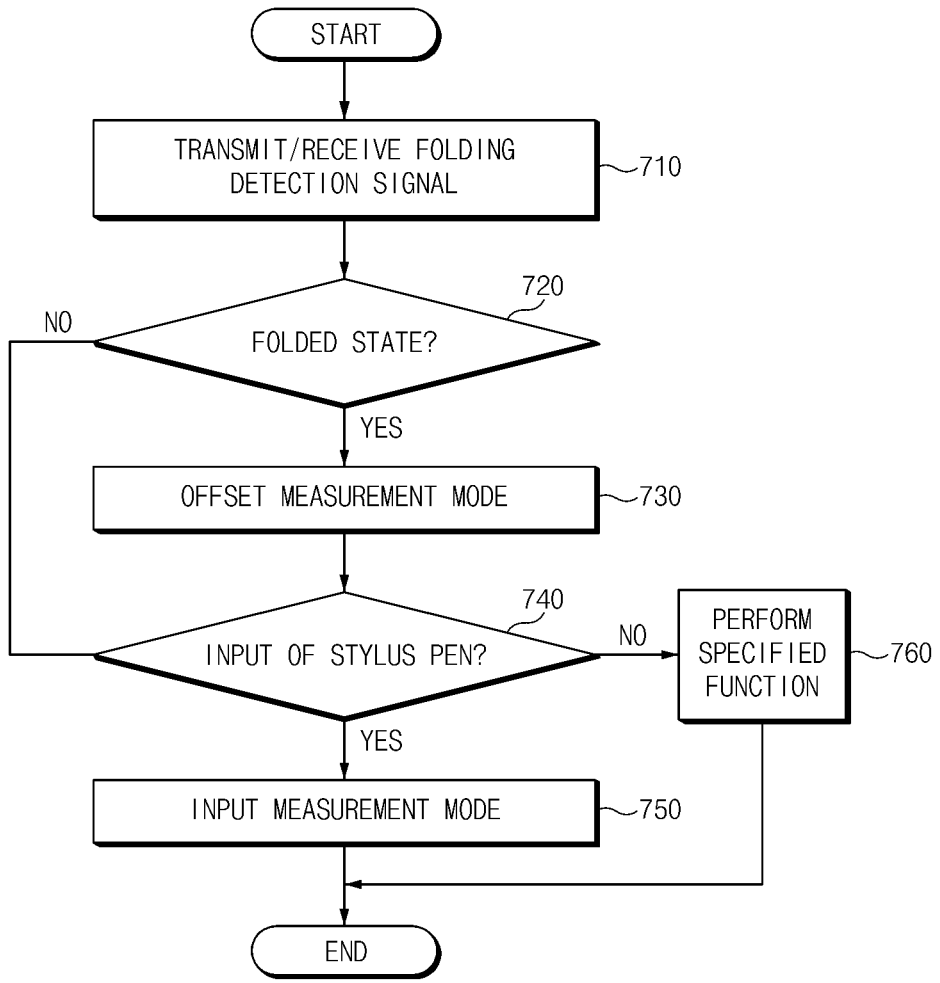
FIG. 7 is a flowchart illustrating an operation of a foldable electronic device, according to certain embodiments.

FIG. 7 is a flowchart illustrating an operation of a foldable electronic device, according to certain embodiments. An operation of the foldable electronic device illustrated in FIG. 7 may be performed by the processor 460, the control unit 450, and the memory 470 of the electronic device 401 illustrated in FIG. 4, and thus the operation of the foldable electronic device shown in FIG. 7 will be described with reference to FIG. 4.

Referring to FIG. 7, in operation 710, the control unit 450 may output a folding detection signal through the plurality of first vertical channels (YL11, YL12, . . . , YL1n) of the sensor panel 400 and then may receive the folding detection signal through the second vertical channels (YL21, YL22, . . . , YL2n). For example, the plurality of first vertical channels (YL11, YL12, . . . , YL1n) and the plurality of second vertical channels (YL21, YL22, . . . , YL2n) may be disposed in different housings and may be disposed symmetrically to each other.

In operation 720, the processor 460 may detect the folded state of the foldable electronic device by using the intensity of the folding detection signal received through the plurality of second vertical channels (YL21, YL22, . . . , YL2n). The processor 460 may determine at least one of an upper limit region and a lower limit region in which the intensity of the folding detection signal received through the plurality of second vertical channels (YL21, YL22, . . . , YL2n) is distributed with respect to a threshold value. When the intensity of the folding detection signal received through the plurality of second vertical channels (YL21, YL22, . . . , YL2n) is distributed in the upper limit region with respect to the threshold value, the processor 460 may determine that the foldable electronic device is fully folded. When the intensity of the folding detection signal received through the plurality of second vertical channels (YL21, YL22, . . . , YL2n) is distributed in the lower limit region with respect to the threshold value, the processor 460 may determine that the foldable electronic device is fully unfolded. When the intensity of the folding detection signal received through the plurality of second vertical channels (YL21, YL22, . . . , YL2n) is distributed in the upper limit region and the lower limit region with respect to the threshold value, the processor 460 may determine that the foldable electronic device is partially folded.

When the processor 460 determines that the foldable electronic device 401 is fully folded, in operation 730, the processor 460 may control the foldable electronic device 401 to operate in an offset measurement mode. In the offset measurement mode, the processor 460 may measure the deviation of the foldable electronic device 401 and then may determine a compensation value by selecting a lookup table corresponding to the measured deviation. The offset measurement mode may be performed in a state where the foldable electronic device 401 is fully folded while the foldable electronic device 401 is manufactured or after the foldable electronic device 401 is manufactured.

In certain embodiments, the electronic device may be initialized to select the lookup table corresponding to the measured deviation, as a factory setting. In other embodiments, the offset measurement mode may be performed during the user setup shortly that is performed when the user starts using the electronic device. In other embodiments, the offset measurement mode can be performed at periodically or during a software update.

In operation 740, the processor 460 may determine whether the input of the stylus pen is received, after performing the offset measurement mode. Furthermore, when it is determined, in operation 720, that the foldable electronic device is partially folded or unfolded, the processor 460 may determine whether the input of the stylus pen is received. When the input of the stylus pen is not received, in operation 760, the processor 460 may perform a function according to the input. Performance of the function does not require determination of input information from the stylus pen. For example, the processor 460 may identify the received event type, and then may perform various functions, such as a call function, a file playback function, or a file editing function, depending on the event type.

When the input of the stylus pen is received, in operation 750, the processor 460 may control the foldable electronic device to operate in the input measurement mode. In the input measurement mode, the processor 460 may process the input of the stylus pen, to which the compensation is applied, by applying the compensation value determined in operation 730 to the received input of the stylus pen. In the meantime, the input of the stylus pen may be received without performing operation 730 in a state where it is determined, in operation 720, that the foldable electronic device is partially folded or unfolded. The processor 460 may apply the compensation value corresponding to the lookup table applied in the previous input measurement mode to the current input of the stylus pen.

Figure 8:
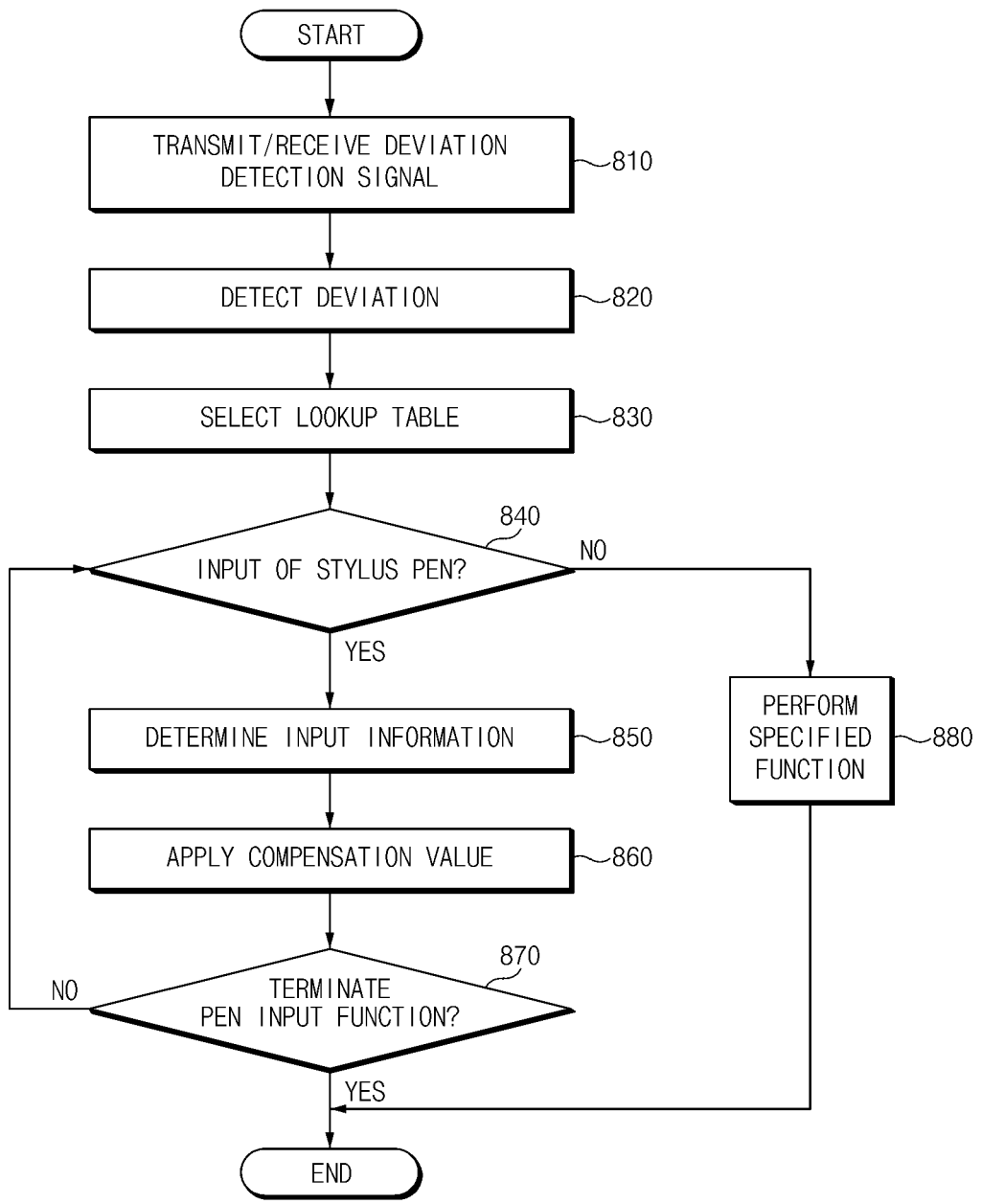
FIG. 8 is a flowchart for describing in detail operations of an offset measurement mode and an input measurement mode of a foldable electronic device, according to an embodiment.

FIG. 8 is a flowchart for describing in detail operations of an offset measurement mode and an input measurement mode of a foldable electronic device, according to an embodiment.

Operations of an offset measurement mode and an input measurement mode of the foldable electronic device illustrated in FIG. 8 may be performed by the processor 460, the control unit 450, and the memory 470 of the electronic device 401 illustrated in FIG. 4, and thus the operation of the foldable electronic device shown in FIG. 8 will be described with reference to FIG. 4. According to an embodiment, operation 810, operation 820, and operation 830 of FIG. 8 may be included in the offset measurement mode shown in FIG. 7. Operation 850 and operation 860 may be included in the input measurement mode shown in FIG. 7.

Referring to FIG. 8, in operation 810, the control unit 450 may output a deviation detection signal through the plurality of first vertical channels (YL11, YL12, . . . , YL1n) of the sensor panel 400 and then may receive the deviation detection signal through the second vertical channels (YL21, YL22, . . . , YL2n). For example, the plurality of first vertical channels (YL11, YL12, . . . , YL1n) and the plurality of second vertical channels (YL21, YL22, . . . , YL2n) may be disposed in different housings and may be disposed symmetrically to each other.

In operation 820, the processor of the foldable electronic device 401 may detect the deviation of the foldable electronic device through the received deviation detection signal.

In operation 830, the processor 460 may determine a compensation value by selecting a lookup table corresponding to the detected deviation of the foldable electronic device 401.

In operation 840, the processor 460 may determine whether the input of the stylus pen is received. When the input of the stylus pen is not received, in operation 880, the processor 460 may perform a specified function that does not use a stylus pen. For example, the processor 460 may identify the received event type, and then may perform various functions, such as a call function, a file playback function, or a file editing function, depending on the event type.

When the input of the stylus pen is received, in operation 850, the processor may detect the input position, input type (a touch input or a hovering input), and/or pen pressure of the stylus pen based on the signal received from the stylus pen. The processor 460 may detect the input type of the stylus pen through the frequency or phase of the signal received from the stylus pen.

For example, when at least one of the frequency and phase of the signal received from the stylus pen is not greater than a threshold value, the processor 460 may determine that the input type of the stylus pen is a touch input. When at least one of the frequency and phase of the signal received from the stylus pen exceeds the threshold value, the processor 460 may determine that the input type of the stylus pen is a hovering input.

It is noted that the input information determined at step 850 is calculated from measurements, where the calculations are based on expected characteristics of the electronic device. However, the actual characteristics of the electronic device may vary from the expected characteristics.

In operation 860, in the input measurement mode, the processor 460 may process the input of the stylus pen, to which the compensation is applied, by applying the compensation value determined in operation 730 to the received input of the stylus pen. For example, the processor 460 may detect the input position, input type (touch or hovering), and pen pressure of the stylus pen. The compensation value compensates for the fact that actual characteristics deviate from the expected characteristics.

When a request for terminating the input function of the stylus pen is received from a user, in operation 870, the processor 460 may detect the request and may terminate the pen input function. When there is no termination of the pen input function, a procedure may return to operation 840.

According to certain embodiments of this specification, a foldable electronic device may include a first housing in which a first region of the flexible display is positioned, a second housing in which a second region of the flexible display is positioned, a hinge structure interposed between the first housing and the second housing and forming a folding axis, a sensor panel interposed between the flexible display and each of the first housing and the second housing, the sensor panel configured to identify input information of a stylus pen, and including a plurality of first vertical channels interposed between the first housing and the first region of the flexible display and a plurality of second vertical channels interposed between the second housing and the second region of the flexible display, and a processor controlling the sensor panel. The processor may detect whether the foldable electronic device is folded, when the foldable electronic device is folded, may transmit a deviation detection signal to at least one of the plurality of first vertical channels and may receive the deviation detection signal through at least one of the plurality of second vertical channels, and may correct the input information of the stylus pen using a compensation value corresponding to the received deviation detection signal.

According to certain embodiments of this specification, the processor may detect whether the electronic device is folded, by transmitting a folding detection signal to each of the plurality of first vertical channels, and then receiving the folding detection signal through each of the plurality of second vertical channels.

According to certain embodiments of this specification, the processor may detect whether the electronic device is folded, by using an intensity distribution of the received folding detection signal.

According to certain embodiments of this specification, the processor may detect whether the electronic device is folded, by using at least one of a Hall sensor and a motion sensor.

According to certain embodiments of this specification, when the electronic device is folded, the processor may transmit and receive the deviation detection signal.

According to certain embodiments of this specification, the sensor panel may be a digitizer that detects the stylus pen.

According to certain embodiments of this specification, the sensor panel may further include a plurality of horizontal channels.

According to certain embodiments of this specification, the processor may transmit and receive an input detection signal for recognizing the input information of the stylus pen through the first vertical channels, the second vertical channels, and the horizontal channels.

According to certain embodiments of this specification, the foldable electronic device may further include a memory configured to store the compensation value set to correct the input information of the stylus pen.

According to certain embodiments of this specification, the processor may update the compensation value by periodically transmitting and receiving the deviation detection signal.

According to certain embodiments of this specification, an operating method of a foldable electronic device that recognizes a stylus pen may include detecting whether the foldable electronic device is folded, when the foldable electronic device is folded, transmitting and receiving a deviation detection signal through a sensor panel, and correcting input information of the stylus pen using a compensation value corresponding to the received deviation detection signal. The sensor panel may include a plurality of first vertical channels and a plurality of second vertical channels, which are separated with respect to a folding axis of the foldable electronic device. The transmitting and receiving of the deviation detection signal through the sensor panel may include transmitting the deviation detection signal to at least one of the plurality of first vertical channels and receiving the deviation detection signal through at least one of the plurality of second vertical channels.

According to certain embodiments of this specification, the detecting of whether the foldable electronic device is folded may include transmitting a folding detection signal to each of the plurality of first vertical channels and receiving the folding detection signal through each of the plurality of second vertical channels.

According to certain embodiments of this specification, the processor may detect whether the electronic device is folded, by using an intensity distribution of the received folding detection signal.

According to certain embodiments of this specification, the sensor panel may further include a plurality of horizontal channels intersecting the plurality of first vertical channels and the plurality of second vertical channels. The correcting of the input information of the stylus pen by using the compensation value corresponding to the received deviation detection signal may include transmitting and receiving an input detection signal for recognizing the input information of the stylus pen through the first vertical channels, the second vertical channels, and the horizontal channels and applying the compensation value to the received input detection signal.

According to certain embodiments of this specification, the operating method may further include updating the deviation feature of the electronic device by periodically operating the foldable electronic device in an offset measurement mode for transmitting and receiving the deviation detection signal.

According to certain embodiments of this specification, a foldable electronic device may include a flexible display, a sensor panel disposed under the flexible display configured to identify input information of a stylus pen, and including a plurality of first vertical channels and a plurality of second vertical channels, and a processor controlling the sensor panel. The processor may transmit a deviation detection signal for recognizing a deviation from expected characteristics of the electronic device to at least one of the plurality of first vertical channels when the plurality of first vertical channels and the plurality of second vertical channels are arranged such that the plurality of first vertical channels respectively face the plurality of second vertical channels, may receive the deviation detection signal through at least one of the plurality of second vertical channels, and may correct the input information of the stylus pen by using a compensation value corresponding to the received deviation detection signal.

According to certain embodiments of this specification, the processor may detect whether the electronic device is folded, by transmitting a folding detection signal to each of the plurality of first vertical channels, and then receiving the folding detection signal through each of the plurality of second vertical channels.

According to certain embodiments of this specification, when the electronic device is folded, the processor transmits and receives the deviation detection signal.

According to certain embodiments of this specification, the sensor panel may further include a plurality of horizontal channels.

According to certain embodiments of this specification, the processor may transmit and receive an input detection signal for recognizing the input information of the stylus pen through the first vertical channels, the second vertical channels, and the horizontal channels.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A foldable electronic device comprising:
a flexible display;
a first housing in which a first region of the flexible display is positioned;
a second housing in which a second region of the flexible display is positioned;
a hinge structure interposed between the first housing and the second housing and forming a folding axis;
a sensor panel interposed between the flexible display and each of the first housing and the second housing, the sensor panel configured to identify input information of a stylus pen, and including a plurality of first vertical channels interposed between the first housing and the first region of the flexible display and a plurality of second vertical channels interposed between the second housing and the second region of the flexible display; and
a processor configured to control the sensor panel,
wherein the processor is configured to:
detect whether the foldable electronic device is folded, by transmitting a folding detection signal to each of the plurality of first vertical channels, and then receiving the folding detection signal through each of the plurality of second vertical channels;
when the foldable electronic device is folded, transmit a deviation detection signal to at least one of the plurality of first vertical channels and receive the deviation detection signal through at least one of the plurality of second vertical channels; and correct the input information of the stylus pen using a compensation value corresponding to the received deviation detection signal.

2. The foldable electronic device of claim 1, wherein the processor detects whether the foldable electronic device is folded, based on an intensity distribution of the received folding detection signal.

3. The foldable electronic device of claim 1, wherein the processor detects whether the foldable electronic device is folded, based on at least one of a Hall sensor and a motion sensor.

4. The foldable electronic device of claim 1, wherein, when the foldable electronic device is folded, the processor determines that the plurality of first vertical channels and the plurality of second vertical channels are arranged such that the plurality of first vertical channels respectively face the plurality of second vertical channels, and transmits and receives the deviation detection signal.

5. The foldable electronic device of claim 1, wherein the sensor panel is a digitizer that detects the stylus pen with the sensor panel.

6. The foldable electronic device of claim 1, wherein the sensor panel further includes a plurality of horizontal channels,
wherein the plurality of first vertical channels and the plurality of second vertical channels extend in a first direction in parallel with the folding axis, and
wherein the plurality of horizontal channels extends in a second direction intersecting the first direction.

7. The foldable electronic device of claim 6, wherein the processor transmits and receives an input detection signal for recognizing the input information of the stylus pen through the plurality of first vertical channels, the plurality of second vertical channels, and the plurality of horizontal channels.

8. The foldable electronic device of claim 1, further comprising:
a memory configured to store the compensation value set to correct the input information of the stylus pen.

9. The foldable electronic device of claim 1, wherein the processor updates the compensation value of the foldable electronic device by periodically transmitting and receiving the deviation detection signal.

10. An operating method of a foldable electronic device that recognizes a stylus pen, the method comprising:
detecting whether the foldable electronic device is folded;
when the foldable electronic device is folded, transmitting and receiving a deviation detection signal through a sensor panel; and
correcting input information of the stylus pen using a compensation value corresponding to the received deviation detection signal,
wherein the sensor panel includes a plurality of first vertical channels and a plurality of second vertical channels, which are separated with respect to a folding axis of the foldable electronic device, and
wherein transmitting and receiving of the deviation detection signal through the sensor panel includes:
transmitting the deviation detection signal to at least one of the plurality of first vertical channels; and
receiving the deviation detection signal through at least one of the plurality of second vertical channels, and
wherein detecting of whether the foldable electronic device is folded includes:

transmitting a folding detection signal to each of the plurality of first vertical channels; and
receiving the folding detection signal through each of the plurality of second vertical channels.

11. The method of claim 10, wherein detecting of whether the foldable electronic device is folded includes:
detecting whether the foldable electronic device is folded, using an intensity distribution of the received folding detection signal.

12. The method of claim 10, wherein the sensor panel further includes:
a plurality of horizontal channels intersecting the plurality of first vertical channels and the plurality of second vertical channels,
wherein correcting of the input information includes:
transmitting and receiving an input detection signal through the plurality of first vertical channels, the plurality of second vertical channels, and the plurality of horizontal channels; and
applying the compensation value to the received input detection signal.

13. The method of claim 10, further comprising:
updating the compensation value of the foldable electronic device by periodically transmitting and receiving the deviation detection signal.

14. A foldable electronic device comprising:
a flexible display;
a sensor panel disposed under the flexible display configured to identify input information of a stylus pen, and including a plurality of first vertical channels and a plurality of second vertical channels; and
a processor configured to control the sensor panel,
wherein the processor detects whether the foldable electronic device is folded, by transmitting a folding detection signal to each of the plurality of first vertical channels, and then receiving the folding detection signal through each of the plurality of second vertical channels,
wherein the processor is configured to:
when the plurality of first vertical channels and the plurality of second vertical channels are arranged such that the plurality of first vertical channels respectively face the plurality of second vertical channels, transmit a deviation detection signal to at least one of the plurality of first vertical channels;
receive the deviation detection signal through at least one of the plurality of second vertical channels; and
correct the input information of the stylus pen by using a compensation value corresponding to the received deviation detection signal.

15. The foldable electronic device of claim 14, wherein, when the foldable electronic device is folded, the processor transmits and receives the deviation detection signal.

16. The foldable electronic device of claim 14, wherein the sensor panel further includes a plurality of horizontal channels,
wherein the plurality of first vertical channels and the plurality of second vertical channels extend in a first direction in parallel with a folding axis of the foldable electronic device, and
wherein the plurality of the horizontal conductive channels extends in a second direction intersecting the first direction.

17. The foldable electronic device of claim 16, wherein the processor transmits and receives an input detection signal for recognizing the input information of the stylus pen through the plurality of first vertical channels, the plurality of second vertical channels, and the plurality of horizontal channels.

\* \* \* \* \*